United States Patent
Wang et al.

(10) Patent No.: US 9,350,596 B2
(45) Date of Patent: May 24, 2016

(54) ON-DEMAND TETHERED GREEDY VIRTUAL APPLICATION APPLIANCE

(71) Applicants: Chuanbao Wang, Kanata (CA); Mark Woodward, Stittsville (CA); Bill Cullen, Cambridge, MA (US); Greg O'Connor, Andover, MA (US)

(72) Inventors: Chuanbao Wang, Kanata (CA); Mark Woodward, Stittsville (CA); Bill Cullen, Cambridge, MA (US); Greg O'Connor, Andover, MA (US)

(73) Assignee: AppZero Corp, Ottawa, Ontario (CA)

( * ) Notice: Subject to any disclaimer, the term of this patent is extended or adjusted under 35 U.S.C. 154(b) by 448 days.

(21) Appl. No.: 13/897,135

(22) Filed: May 17, 2013

(65) Prior Publication Data
US 2013/0311603 A1 Nov. 21, 2013

Related U.S. Application Data (60) Provisional application No. 61/649,082, filed on May 18, 2012.

(51) Int. Cl.
| | |
|---|---|
| *G06F 15/16* | (2006.01) |
| *H04L 29/08* | (2006.01) |
| *G06F 9/50* | (2006.01) |
| *G06F 9/54* | (2006.01) |

(52) U.S. Cl.
CPC ............... *H04L 29/08* (2013.01); *G06F 9/5077* (2013.01); *G06F 9/545* (2013.01); *H04L 67/10* (2013.01); *H04L 67/1095* (2013.01); *G06F 2209/542* (2013.01)

(58) Field of Classification Search
CPC .................................................... H04L 67/148
USPC .......................................................... 709/217
See application file for complete search history.

(56) References Cited

U.S. PATENT DOCUMENTS

| | | | | |
|---|---|---|---|---|
| 6,434,608 B1 * | 8/2002 | Desai | .................. | H04L 67/2852 709/203 |
| 6,981,070 B1 * | 12/2005 | Luk | ...................... | G06F 3/0617 707/999.2 |
| 7,757,291 B2 | 7/2010 | Rochette et al. | ................ | 726/24 |
| 7,774,762 B2 | 8/2010 | Rochette et al. | .............. | 717/138 |
| 7,784,058 B2 | 8/2010 | Rochette et al. | .............. | 719/310 |
| 2008/0222160 A1 | 9/2008 | MacDonald et al. | ........... | 707/10 |
| 2010/0037235 A1 * | 2/2010 | Larimore | ................ | G06F 9/455 719/312 |
| 2010/0318997 A1 * | 12/2010 | Li | ........................ | G06F 9/45558 718/104 |
| 2012/0059871 A1 * | 3/2012 | Jahn | .................. | G06F 15/17331 709/203 |

* cited by examiner

*Primary Examiner* — Jason Recek
(74) *Attorney, Agent, or Firm* — Matthew A. Pequignot; Pequignot + Myers LLC (57) ABSTRACT

A computer-implemented virtual application appliance (VAA) and method for managing migration of an application on a source computer to a virtual application within the VAA on a target computer networked to the source computer are disclosed. The VAA includes resources on the target computer, a virtual application for execution in the VAA, and network credentials for remotely connecting to the source computer and copying data resources from the source computer. A runtime intercept of the VAA compares on-demand resource requests of the virtual application to resources on the target computer and provides the requested resource to the virtual application. When the runtime intercept fails to locate the requested resource in the resources on the target computer, a tether of the VAA remotely retrieves the requested resource from the source computer using the network credentials and then copies the requested resource into the resources on the target computer.

14 Claims, 5 Drawing Sheets

ON-DEMAND TETHERED GREEDY VIRTUAL APPLICATION APPLIANCE

CROSS-REFERENCE TO RELATED APPLICATIONS

The present disclosure claims priority from U.S. Provisional Patent Application No. 61/649,082 filed May 18, 2012, entitled "Tethered Greedy Virtual Application Appliance", which is incorporated herein by reference for all purposes.

TECHNICAL FIELD

The present disclosure relates to virtualization of software on a target computer based on resources located on a source computer. More particularly, the present disclosure relates to how to create a virtual application from an application running on a source computer without needing to modify the source computer from which the application receives its virtual resources.

BACKGROUND OF THE INVENTION

Outdated computer infrastructure and changing technology and business processes are just a few examples of challenges that have only increased in complexity in today's highly computerized world. Rare are the circumstances where a clean transition from using one technology to using another can be achieved. More often, migration of technology involves significant planning, risks and costs.

Virtual Application Appliances automate the migration of applications from source computers to target computers. For example, an application is installed on a source computer and there is a desire to migrate that application to another, target computer. This can be done manually by re-installing the application on the target computer or transferring the binaries for the application, resulting in an "empty" application missing all the business data, configuration settings and customization found in the application on the source computer. All of this needs to be identified on the source computer then transferred and reconstituted on the target computer. This can be achieved manually or using scripts, application tools, ETL (Extract, Transform, Load), replication etc. But however it is achieved, this process will be unique to each application that is migrated and will require significant knowledge of the application to identify all of the data resources to be transferred from the source computer and then to properly re-associate them with the application on the target computer. This approach is disadvantageous because it must be assessed and engineered ad-hoc and specific to the application and customer infrastructure.

Another approach used to simplify this process is called physical to virtual or P2V technology. P2V capture images of the entire source computer and moves the whole image (OS, configuration, device drivers, management infrastructure, etc. in addition to the desired application) to virtual or cloud infrastructure. This is disadvantageous for operators of managed public and private cloud computing services, which in order to operate profitably prefer to use a consistent "operational stack" (OS, security configuration, management infrastructure) across all their customers. P2V copies over the customer's entire source computer "as is" with potentially incompatible infrastructure with the cloud operator's environment and processes. Because P2V also captures images at the computer (and not application) level, it suffers from similar disadvantages as the time-differencing approach, discussed below.

The time-differencing approach is a more common approach to migrating technology. This approach identifies differences between two images of a computer taken at different times. If the first image is taken before the subject application was installed and the second image was taken immediately before the subject application is migrated, then the difference between the two images includes all of the data resources of the subject application. This approach suffers from several disadvantages. One major disadvantage is the foresight necessary to prepare the first image before the subject application is installed. Oftentimes, this image is not available because migration of an application may not be thought of until well after that application was first installed.

Another major disadvantage is that the time-differencing approach is very over-inclusive. It looks at the entire computer system (not just the subject application) and all differences since that first image are captured (not just those relevant to the subject application). This can include a significant number of differences that are unrelated to the application. For example, some other applications may be installed between the two images or some other applications may change data between the two images. Under the time-differencing approach, all of these differences would be caught and presumed to be relevant to the subject application.

Another disadvantage is that the time-differencing approach may be under-inclusive. It cannot identify any resources that the subject application requires (but has not modified) between the two images. For example, a specific required service or package that was on the computer before installing the subject application. These required but unchanged resources would be removed when the two images are compared for differences causing the virtual application on the target computer to be under supplied and missing some of its resources. The time-differencing approach also cannot account for resources that the application has not yet required or used, but which may be required in the future. For example, a never before used file format conversion extension may be needed by the virtual application in the future. The difference approach does not catch this problem.

A variety of different time-differencing approaches have been used in application virtualization and other application deployment infrastructures for the task of identifying and packaging the components of an application. Generally, these approaches use a set of tools to take successive snapshots of an application in its environment on the source computer. A snapshot of the source computer's OS contents is taken prior to installing the application to be virtualized. Once the snapshot is taken the application is installed and then a second snapshot is taken to determine the differences. The differences are used to create the VAA. In more complex scenarios, a series of snapshots over the installation and configuration process produce multiple difference sets which can be applied independently; either way, the differences are captured over different states of the same source computer over time.

Some time-differencing approaches are applied in development or test environments by setting up a clean test computer, taking the first image, installing a copy of the application to be virtualized, taking a second image after installation, then calculating the difference to create a VAA based on the differences in a staged environment. This works if all states and execution paths of the application are reproducible in a test environment; however, the vast majority of business applications in production are operated with only a subset or sample data in development and test, even at best-practice levels of operational staging. A large percentage of applications are in production likely without any operational staging at all, reducing the breadth of applicability of the time-differencing approach.

Because the time-differencing approach presumes everything that has changed between the two images is related to the application, it is very difficult to use the difference approach on an active, online and in service computer where many other applications (unrelated to the one being virtualized) may also be changing the source computer at the same time, where multiple applications may have been installed since an image of the source computer was taken, where there may not be any images of the source computer prior to installing the application to be virtualized, or where the application to be virtualized may have been installed on the source computer a long time ago and multiple other applications or changes to the source computer have occurred since then which make the time-differencing approach less than ideal.

The differencing approach focuses exclusively on the source computer to identify the requirements of the virtual application. It requires changing the source computer (which often cannot be done, or is too risky when the source computer is online and actively in service) to create the VAA. This is a significant disadvantage that cannot be overstated.

Another disadvantage of the difference approach is that it cannot be readily used in real time on an application running on an active source computer. Preparation of the source computer, testing of the extracted differences to ensure nothing was missed and finally transitioning from the source computer to the target computer without losing business data or affecting the level of service offered are challenging problems that cannot be overcome without careful planning using the differencing approach.

The present disclosure seeks to overcome some of the disadvantages of the time-differencing approach.

SUMMARY OF THE INVENTION

The present disclosure teaches how to migrate any application from any source computer to a target computer at any time without modifying the source computer. A virtual application appliance (VAA) on the target computer transparently intercepts requests for application components and resources on demand as the virtualized application is executed in the VAA. Any data requested that are not on the target computer are transparently retrieved by establishing an on demand network connection to the source computer to copy the missing data onto the target computer. In this manner, any application on a source computer in any state can be migrated at any time into a VAA on a target computer. As new resources are required on demand by the virtual application from the source computer, the migration iteratively completes an image of all resources required for the application. Because the on demand network connection to the source computer is always available, the problem of ensuring a 100% complete set of application resources becomes significantly less important. Advantageously, the source computer is not modified and no images prior to installing the application on the source computer are required.

The migration approach described herein avoids the need for an image of the source computer without the application by focusing on the current differences between the target and source computers instead of the past differences between states of the source computer and detecting and copying the requested resources on demand from the source computer during execution of the application on the target computer. This allows a remotely installed application to be executed and copied to a target computer without any resources of the application yet being installed or present on the target computer. Over time, this new migration approach can create a complete image of the resources required by the migrated application without having to resort to a time-differencing approach, applied over time to a single source computer.

An aspect of the present disclosure provides a target computer for executing a virtualized application when in a network with a source computer having the application. The target computer comprises: a non-transient computer readable memory having instructions and data resources; and a processor connected to the memory for executing the instructions. The data resources include: credentials for remotely connecting to the source computer and copying data resources from the source computer; and a virtual application identity for identifying the application installed on the source computer to be virtualized on the target computer. The instructions include: a virtual application appliance (VAA) for: intercepting data requests from the virtualized application; searching the data resources on the target computer for each data request intercepted; providing the requested data to the virtual application from the data resources when the searching finds the requested data in the data resources on the target computer; remotely connecting to the source computer using the credentials when the searching does not find the requested data in the data resources on the target computer; copying the requested data from the source computer to the data resources of the target computer after remotely connecting; and providing the requested data to the virtualized application after remotely connecting.

Another aspect of the present disclosure provides a computer-implemented method for executing a virtual application on a target computer of a network from an application on a source computer of the network. The method comprises: providing a virtual application appliance (VAA) on the target computer; identifying the application to the VAA; providing, on the target computer, data resources including copies of some data resources associated with the application on the source computer; and intercepting, by the VAA, a request for a first data resource by the virtual application during execution of the virtual application on the target computer. In response to the intercepting, the method includes searching, by the VAA, the data resources for the first data resource. If the searching finds the first data resource, the method includes providing, by the VAA, the first data resource to the application on the target computer from the data resources; If the searching does not find the first data resource in the data resources on the target computer: the method includes remotely connecting, by the VAA, to the source computer from the target computer; in response to the remotely connecting, copying, by the VAA, the first data resource from the source computer to the data resources of the target computer; and in response to the remotely connecting, providing the first data resource to the virtual application on the target computer.

Yet another aspect of the present disclosure provides a virtual application appliance (VAA) for managing migration of an application on a source computer to a virtual application within the VAA on a target computer networked to the source computer. The VAA comprises: resources on the target computer; a virtual application for execution in the VAA; network credentials for remotely connecting to the source computer and copying data resources from the source computer; a runtime intercept for comparing on-demand resource requests of the virtual application to resources on the target computer and providing the requested resource to the virtual application; and a tether for, when the runtime intercept fails to locate the requested resource in the resources on the target computer, remotely retrieving the requested resource from the source computer using the network credentials and then copying the requested resource into the resources on the target computer.

BRIEF DESCRIPTION OF THE DRAWINGS

Embodiments of the present disclosure are described with reference to the following figures.

DETAILED DESCRIPTION

While preferred embodiments may be illustrated or described, they are not intended to limit the invention. Rather, numerous changes including alternatives, modifications and equivalents may be made as would be understood by the person skilled in the art.

In the context of the present disclosure, a computer comprises one or more virtual or physical computing platforms including one or more non-transient computer readable memories having instructions and data resources and on one or more processors connected to the memories for executing the instructions. A source computer comprises a computer on which the application to be virtualized is installed, including data resources associated with that application. A target computer comprises a computer on which an embodiment of the present disclosure is installed to run a virtualized copy of the application installed on the source computer.

In the context of the present disclosure, data resources comprise the transient and persistent data of a computer stored in its memories including, using a Windows™ operating system context as a non-limiting example: files; registry hives, keys, entries and values; services; and environment variables.

Throughout the present disclosure the term resources comprises all hardware, software and data of a computer. The term environment is synonymous with resources, unless there is evidence to the contrary; and the term item refers to a single data resource, for non-limiting example using the Windows™ operating system: a file, a registry key, a service or an environment variable.

The present disclosure describes a new Virtual Application Appliance (VAA) or more generally a new application-deployment packaging, which manages application migration by transparently intercepting resource requests on-demand from a running virtual application, locating the requested resources locally or remotely, then transparently providing those resources to the running virtual application. This approach to application migration has been coined the tether approach.

Figure 1:
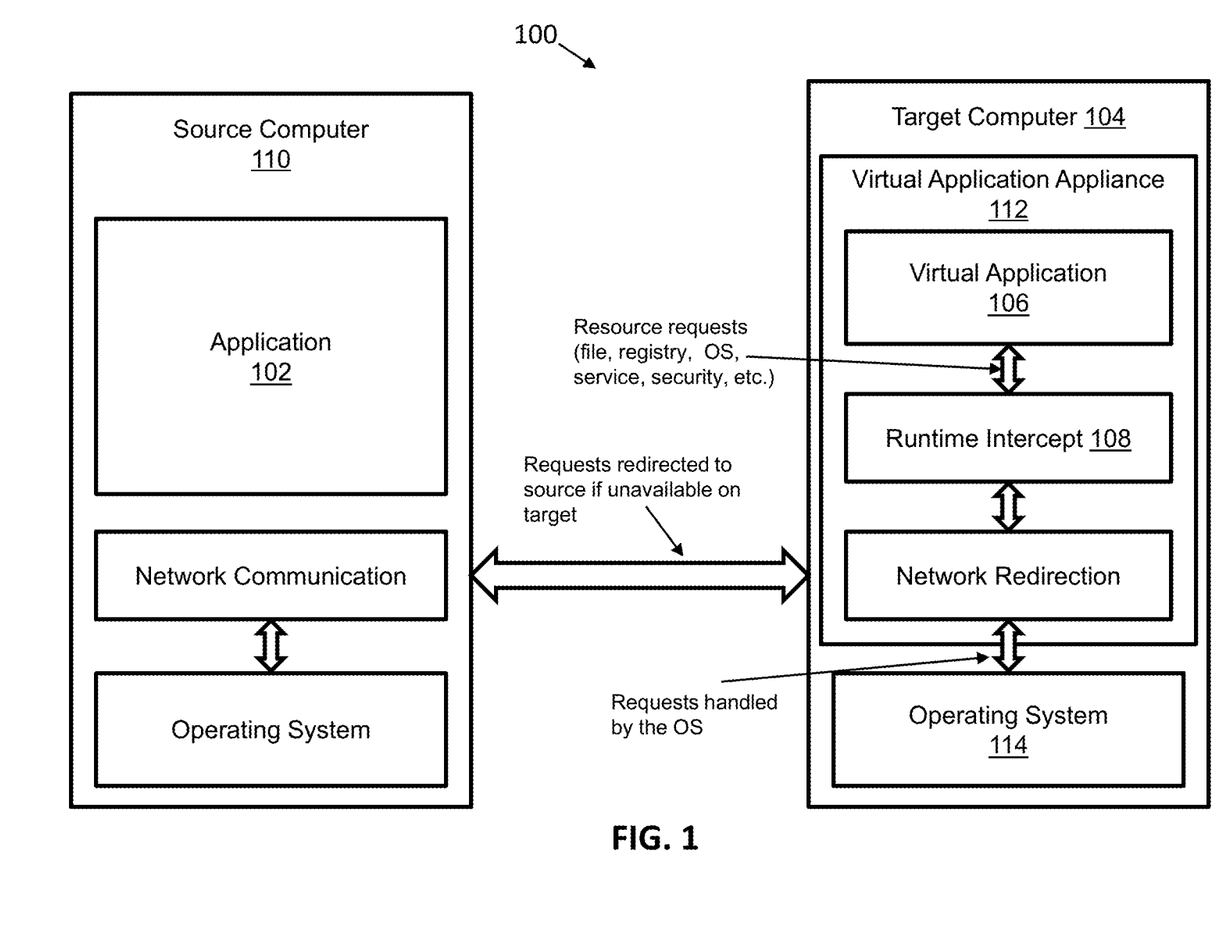
FIG. 1 is a block diagram illustrating the tether approach according to an embodiments of the present disclosure.

Referring to FIG. 1, the tether approach 100 allows migration of applications 102 without a prior installation on the target computer 104 by executing a virtual application 106 on the target computer 104 inside a virtual runtime 108 to determine the constituent resources of the application 102 then retrieving the application resources remotely from the source computer 110 without requiring tools be installed on the source computer 110.

The tether approach 100 captures and applies difference sets between the target computer 104 and the source computer 110: not between two time-differentiated images of the same source computer 110. The tether approach 100 compares the environment of the target computer 104 on which that application is being migrated to the current environment of the source computer 110 that has the application 102 installed. No prior image of the source computer as it existed before the application was installed is needed. Unlike the prior image of the source computer, the target computer environment is always available.

Because the target computer environment being compared during migration is always available, the applicability of the tether approach 100 is greater than that of traditional time-differencing approaches; however, different steps are needed to compensate for the absence of a carefully staged prior image of the source computer. For example, the time-differencing approach attempts to clearly and quickly define all resources that are part of the application 102. Because the tether approach 100 uses on-demand management of resource requests and access to the source computer 110, it is not necessary to clearly or quickly define all resources of the application 102. Rather, bracketing the identity of the application 102, or defining clearly what's part of the application 102 and what is not, can be achieved incrementally and on-demand by executing the virtual application 106 on the target computer 104, monitoring the virtual application's requests for data resources while the virtual application is being used in service, and determining resource dependencies of the virtual application 106. The tether approach 100 depends on watching what the virtualized application 106 does at runtime and connecting to the source computer 110 on-demand to ensure it continues to complete the set of resource dependencies for the virtual application 106 without requiring an "exhaustive" execution of all code paths and usage scenarios. To accelerate the retrieval algorithms, the tether approach 100 may use awareness of the application 102 to accumulate dependencies "greedily" based on file organization and/or patterns of access known for major classes of applications, or in special cases to the details of specific applications being virtualized. Greedy copying of resources will be discussed in greater detail below.

On the source computer 110, the application to be virtualized is already installed, running and operational and may have been installed, running and operational for any period of time. Other than creating, from time to time, a network connection to the source computer 110 to retrieve data resources, the source computer 110 is unaffected by the new VAA 112. No modification or reconfiguration of the source computer 110 or the application to be virtualized is required. The prep work necessary to virtualize an application includes providing the identity of the application to the VAA 112 and providing the network address and sufficient access credentials for the source computer 110. This makes it possible to virtualize any application 102 using the new VAA 112 at any time because the risks that data may be lost on the source computer 110 have been greatly reduced.

A Virtual Application Appliance (VAA) 112 can also be described as a software based computer technology that encapsulates an application 106 from the underlying target computer 104 on which it is executed. A VAA 112 manages a virtual application 106 and the resources associated with that virtual application 106. A Virtual Application 106 is any software application 102 that executes using some resources directly from the computer it is installed on, and some resources that were associated with another computer or computers. For example, a virtual application 106 may use the CPU, memory and basic operating system data resources 114 of a target computer 104 while business data files, user accounts and application settings and customizations may have been stored on another (source) computer 110 which had previously been executing that application 102. By managing a virtual application's data resources, the VAA 112 also manages the virtual application 106 itself because the data resources associated with an application include the application itself.

A virtual application 106 is not installed on the target computer 104 in the traditional sense. Traditionally, when an application 102 is installed on a computer 110, all the application's resources needed to operate all code paths of the application 102 are copied to that computer 110 and configured on it. For a virtual application 106, the application 106 appears to execute as if all its resources are located on the target computer 104; however, some of those resources may be located on another, source computer 110. The VAA 112 abstracts any additional steps necessary for the virtual application 106 to access all the necessary resources.

Each VAA 112 is created "empty" on a target computer 104 and provided access credentials for locating the source computer 110 on the network, connecting to it, and copying data related to the application 102 as well as the identity of the application to be virtualized. The virtual application identity may comprise one or more defined application "services"; or, it may comprise one or more components reported as "installed software" from the systems installed-application metadata; or it may comprise a set of one or more executable files or batch files known to the operators of the source computer 110 to be the launching point of the application.

To virtualize the application, the VAA 112 retrieves data resources associated with the application 102 from the source computer 110 and stores them in the target computer 104. This is achieved by monitoring what data resources are in use by the virtual application 112 on the target computer 104 when the virtual application 112 is running then connecting to the source computer 110 using the provided access credentials to retrieve any data resource not present on the target computer 104.

Instead of trying to retrieve all data resources from the source computer 110 associated with the application 102 in one phase, the tether approach 100 copies all data resources that are found to be relevant, then in a second phase, the tether approach 100 runs the application 102 as a virtual application 106 from within the new VAA 112 on the target computer 104. The first phase would typically include copying the entry-point executables such as binaries, scripts, batch or other files for starting up the virtual application 106. Subsequent phases execute the virtual application 106 in the VAA 112 as a process or processes, and retrieve further data resources as requested in real time by those processes.

When the virtual application 106 requests a data resource, a runtime intercept component 108 of the new VAA 112 transparently intercepts the request and checks whether that data resource is located on the target computer 104. If so, the VAA 112 provides that data resource to the virtual application 106. If not, the runtime intercept component 108 establishes a remote connection with the source computer 110, locates the data resource requested, copies it to the target computer 104 and provides it to the virtual application 106.

The function of the runtime intercept component 108 is to transparently introduce the new VAA 112 into the execution path of off-the-shelf applications 102. The runtime intercept component 108 is part of the new VAA 112 that is installed on the target computer 104. It monitors the activity of the virtual application 106. This technology redirects OS resource requests (such as file and registry requests) from the context of the target computer 104 to a context defined within the VAA 112. This redirection isolates the components of the application 106 from the target system's OS layer 114 while at the same time giving the impression that the application 106 is still executing in the context of the target computer's OS 114. The runtime intercept component 108 is completely transparent to the application 106. Consequently, no changes need to be made to the application 102 for it to run within the new VAA 112.

If a virtual application 106 in a VAA 112 on a target computer 104 requires a data resource (perhaps a file or a registry entry) and that item is not found by the runtime intercept component 108 on the target computer 104, the runtime 108 should be able to download and copy that item from the source computer 110.

The connection between the source 110 and target 104 computers is via a network interface 118 and initiated by the new VAA 112 using existing OS level communication channels. The runtime intercept component 108 on the target computer 104 transparent copies the application components on demand as the application 106 is executed on the target computer 104. The information needed from the source computer 110 for tether 100 to work includes the fully qualified source computer name (or IP address or other network address information) along with a user and password with privileges to administer the computer for example 'root' on a Unix based computer or 'Administrator' on Windows. Together, the network address information and login details comprise the credentials for connecting to the source computer 110.

The runtime intercept component 108 only executes on the target computer 104. The use of the runtime intercept component 108 is not required on the source computer 110 which means the source computer 110 is not modified in anyway by the new VAA 112. After the running the tether approach 100, the source computer 110 is as it was before the beginning of the tether approach 100. Even the remote connecting and copying of resources need not be registered on the source computer 110 and the application 102 and its data can been left unchanged on the source computer 110. Once the runtime intercept component 108 has downloaded the missing file/registry entry from the source computer 110, the file/registry need not be requested again from the source computer 110.

Figure 2:
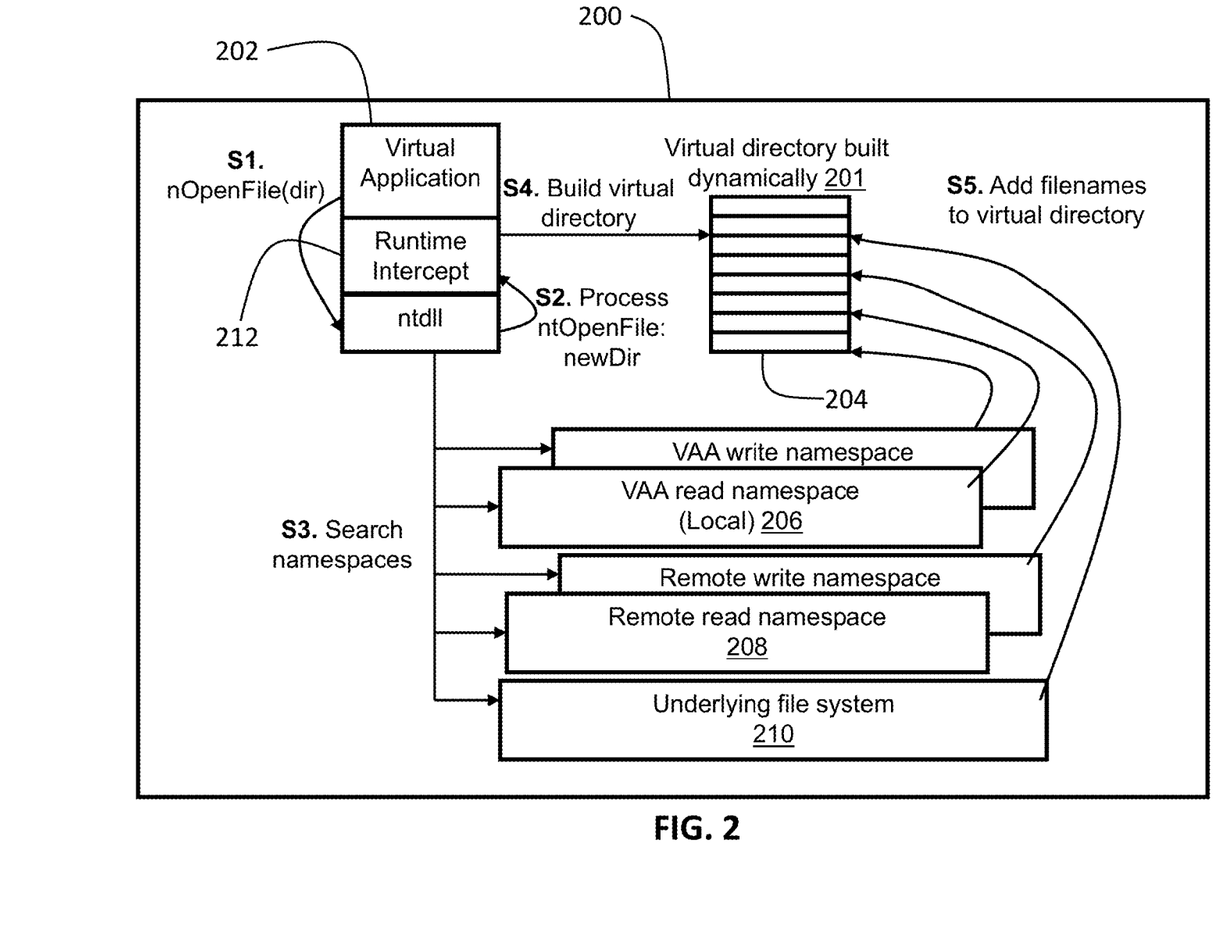
FIG. 2 is a block diagram of a Virtual Application Appliance according to an embodiments of the present disclosure.

In some embodiments, the tether approach 100 may use local namespaces and remote namespaces to determine how to respond to resource requests intercepted from the virtual application. Referring to FIG. 2, a block diagram illustrates an example embodiment of a VAA 200 and an example method S1-S5 for using namespaces when a virtual application 202 requests S1 to open a file.

A namespace comprises a logical entity or construction defined within a VAA 200 that is a view or collection of locations in memory 204 and various access permissions (such as readable and writeable), associated with data resources. For typical application access to the file system or registry in a VAA 200, various namespaces need to be accounted for and folded into a coherent logical view. A virtualized view or virtual directory 201 is constructed using the namespace search order. The virtualized view should mimic a physical view in all aspects. Using remote namespaces, the virtualized view 201 can include locations in memory for data resources on the source computer.

Local namespaces 206 are namespaces whose memory locations point to, or reference, data resources that are locally accessible to the VAA 200 and stored in memory on the target computer 104. Remote namespaces 208 are namespaces whose memory locations point to, or reference, data resources that are accessible to the VAA 200 by remotely connecting over a network 118 to a source computer 110.

Different local and remote namespaces may be defined to separate read and write actions for the same resources. For example, there is always one readable local namespace: the underlying OS file system 210 on the target computer 104. The OS file system read namespace 210 is a local namespace through which most operating system files are found during process loading.

A namespace may hierarchically include other namespaces and maintain order amongst namespaces. This facilitates searching S3 namespaces and can be used as a filter by the runtime intercept component 212 when searching for a resource requested by the virtual application. In some embodiments, each VAA includes two high-level namespaces: the local namespace and the remote namespace. Each may contain multiple other namespaces, generally of the same local or remote type respectively. Almost any number of namespace may be hierarchically layered with a VAA 200.

In some embodiments, the local namespace 206 of a VAA 200 includes all local namespaces that are available to that VAA 200. Some local namespace that may be include in a VAA's local namespace include:

the namespaces of the target computer 104 (referencing, for example, the basic operating system resources) on which the VAA 200 is installed;

the VAA's namespace 206 which references all data resources already known to be associated with the virtual application 202 managed by the VAA 200; and shared namespaces which reference data resources shared by this VAA 200 and other VAAs.

In some embodiments, the remote namespace 208 of a VAA includes all remote namespaces that are available to that VAA 200. Some remote namespaces that may be included in a VAA's remote namespace include:

source namespaces which reference data resources located on the source computer 110 having the application 102.

Shared source namespaces which also reference data resources located on other source computers; however those source computers are associated with this VAA, for example, through another VAA sharing resources with this VAA or through the application 102 being a distributed application.

Remote namespaces and source namespaces are a new type of namespace supported internally in the runtime intercept component 212 of the VAA 200. Remote namespaces reference memory locations of the source computer 110 which are not directly accessible from the target computer 104. To make these remote memory locations accessible on the target computer, the remote namespace retrieves data resources by remotely connecting to a source computer. Thus a key difference between local and remote namespaces is the method of retrieving a data resource. In the case of local namespaces 206, the request is passed on to the native OS API which returns the data resource. In the case of remote namespaces 208, the request involves using the access credentials of the associated source computer 110 (network address and login credentials with sufficient read/write permissions) to retrieve the sought after item remotely from the source computer 110 over a network connection 118.

Despite source computers 110 being remote from the target computer 104, the runtime intercept component 212 can access data resources of the source computer 110 through the remote namespaces and transparently provide these resources to the virtual application 202.

A VAA can contain any or all of the above namespaces but must contain at least one namespace for read and write operations. Depending on the configuration of the VAA 200, the runtime intercept component 212 can manage one or more source namespaces allowing for multiple computers to be used as sources 110 for the VAA 200.

Namespaces also allow multiple VAAs 200 to be used in a stacked configuration. This means VAAs 200 can be used as building blocks. Using three VAAs 200 (one containing a virtual MySql application, a second with a virtual Apache application and a third with a virtual PHP application) combined via shared namespaces produces a virtual WAMP stack. Using this multi-source method and expanding to include source namespaces, distributed applications can be referenced from a single target computer 104. In the case of a primary VAA 200 sharing multiple other VAAs 200, the administrator can configure a different source system for each of the VAAs 200. As a result, the runtime intercept component 212 will internally add one source namespace and one remote namespace for each distinct source computer 104.

The namespaces can also provide an order in which to search for a particular data resource or item requested by the virtual application 202 running within the VAA 200. Generally, all local namespaces 206 are searched before searching remote namespaces 208. Of the local namespaces, different search orders may be applicable for different applications and for different search strategies. In some embodiments, the VAA namespaces are searched first. In some embodiments, the remote and source namespaces associated with the VAA 200 may be searched last.

If the sought after item cannot be resolved or located in the local namespaces 206 of the VAA 200, then that data resource is not present on the target computer 104. The runtime intercept component 212 will then try to resolve the sought after item in the remote and source namespaces 208 associated with the VAA 200.

Each remote namespace of the VAA 200 references memory locations remote from the target computer 104 that are associated with a source computer 110 associated with the VAA 200. The remote/source namespaces 208 are accessible to the runtime intercept component 212 by using the access credentials of source computers 110 (network address and sufficient read permissions) to retrieve the sought after item remotely from the source computer 110 over a network connection 118.

If the resolution succeeds in any of the remote namespaces 208, the runtime 212 will copy the sought after item to the memory 204 of the target computer 104 and reference that data resource in its corresponding VAA namespace. When there are no shared VAA resources, the runtime 212 links the data resource into the one VAA namespace; however, using the WAMP multi-VAA shared resource example, if the PHP VAA requests a resource that not on the target computer 104 but is located on the shared source computer running MySql, then the runtime 212 of the PHP VAA could copy the resource to the VAA namespace for the MySql virtual application instead of its PHP VAA namespace. In some embodiments, the runtime 212 may then repeat the resolution or search for the data resource, which should succeed this time because the missing item has now been copied over to the target computer 104 and linked in at least one of the local namespaces 206.

Figure 3:
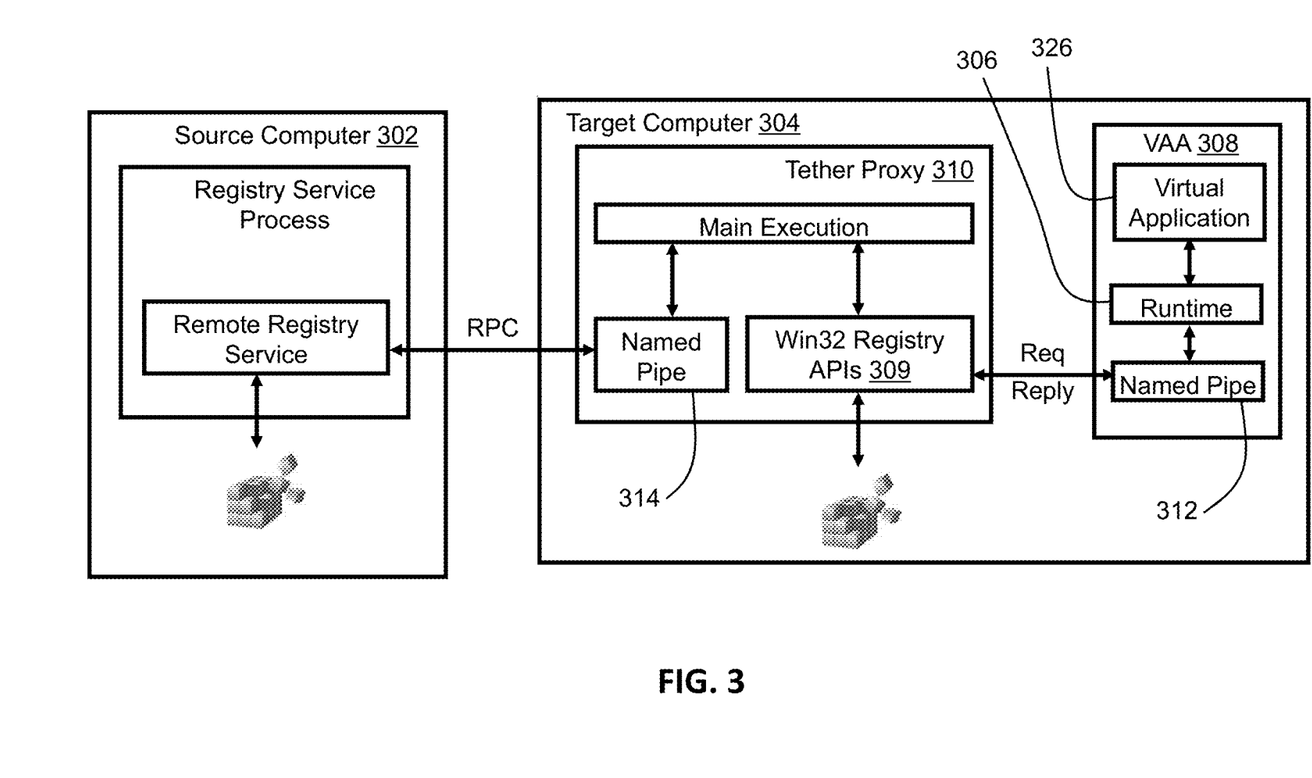
FIG. 3 is a block diagram another tether approach according to an embodiment of the present disclosure.

When retrieving different data resources from either a source computer 110 or a target computer 104, different procedures may be necessary depending on the computers' operating systems and the type of data resource to be retrieved. For example, FIG. 3 illustrates a source computer 302 and a target computer 304 running Windows™ operating systems, a file can be retrieved directly by the runtime intercept component 306; however, when retrieving a registry entry, Windows™ operating systems typically requires a separate process on the target computer 304 using remote procedure calls (RPC). In a Windows-based VAA 308, this separate process is a tether proxy 310.

In order for the runtime intercept component 108, 212, 306 to access a source computer's files, registry, security items, services and other data resources, a remote logon process is needed to authenticate a user with sufficient privileges to access the desired data resources. For example, an administrator user account of the source computer 110, 302 may be used.

Remote file copying can be done directly in the runtime intercept component 306 where the source computer 302 runs a Windows™ operating system because Windows XP and later versions of Microsoft's operating systems by default supports administrative shares for fixed drives. Windows XP and later versions of Microsoft's operating systems by default create administrative shares for the root folders of the fixed drives of the computer. For example, for the root of the C: drive on the computer named mycomputer, Windows automatically shares \\mycomputer\c$. For example, if the requested path is "C:\dir1\dir2\myfile" on a source computer 302 with the network name mysource, then the transformed UNC path will be "\\mysource\C$\dir1\dir2\myfile". Alternatively, the source computer 302 may be identified by IP address or other network addresses. Using this feature, the runtime intercept component 306 can transform a requested OS path into a UNC path representing the corresponding path in the source namespace, and then access the UNC path via Windows native APIs directly from the runtime. For example, the runtime intercept component 302 can directly access the C drive of a source computer named "mysource" with IP address 192.168.1.2 using path \\mysource\c$ or \\192.168.1.2\c$.

Remote file copying can be accomplished on a Unix computer by using a remote mount of the files system via NFS or similar existing mechanisms. Other mechanisms are equally applicable for these, or other, operating systems as is known in the art.

However, in the Windows™ context, remote registry copying cannot be done directly in the runtime intercept component 302 because the Windows support for registry access is by operating remote registry handles using RPC. The NT level APIs do not handle remote registry handles, therefore, a separate process, tether proxy 310, is introduced on the target computer 304 to do the remote registry copy for the runtime intercept component 306.

Like remote file copying, remote registry copying requires means for remote registry access. However, where the source computer 302 runs a Windows™ operating system, remote registry access cannot be done directly in the runtime intercept component 306 because the Windows support for remote registry access is by operating remote registry handles using RPC. Windows™ supports both local and remote registry access with unified Win32 registry APIs 309, however on the lower level, local registry access is implemented on NT level APIs, while remote registry access is implemented with RPC. The NT level APIs do not handle remote registry handles, therefore, a separate process, tether proxy 310, is needed on the target computer 304 to do the remote registry copy for the runtime intercept component 306.

Since the runtime intercept component 306 does not allow RPC access and therefore does not allow remote registry access, a tether proxy 310 is introduced to do the remote registry copy for the runtime intercept component 306. The tether proxy 310 may be a separate process running on the same target computer 304 on which the VAA 308 is deployed. The tether proxy 310 receives registry requests from the runtime intercept component 302 through a named pipe 312 and copies the requested registry items from the source computer 302 using Win32 APIs 309 as illustrated in FIG. 3.

Figure 4:
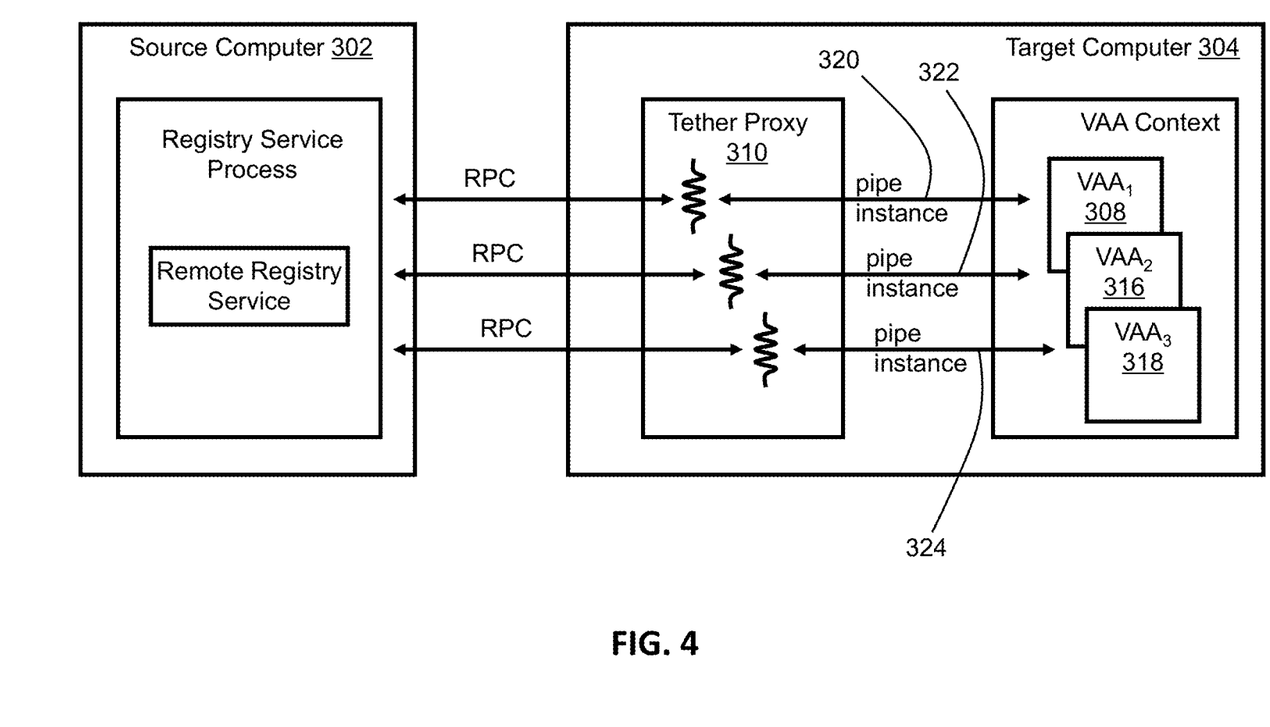
FIG. 4 is a block diagram of a further tether approach according to an embodiment of the present disclosure.

The tether proxy 310 is used to perform remote registry access on behalf of the runtime component 306 in Windows based computers. The tether proxy 310 uses named-pipe 312 to communicate with the VAA 308 and named pipe 314 to communicate via RPC with the source computer 302. As illustrated in FIG. 4, the tether proxy 310 acts as a multi-threaded pipe server. It creates a single named-pipe 312. Whenever there is a connection request from a VAA 308, 316, 318, a new instance 320, 322, 324 of the pipe 312 may be created and a separate thread may be spawned for each pipe instance 320, 322, 324 to serve the requests from each VAA 308, 316, 318.

In some embodiments, each process of a virtual application 326 has its own runtime intercept component 306, but all runtime intercept components 306 of each VAA 308, 316, 318 share one tether proxy 310 by using instances 320, 322, 324 of named pipe 312. Other organizations of processes and their connectivity are equally possible.

When a process of the virtual application 326 is executed within the VAA 308 using a runtime intercept component 306, a check will be made to verify if a tether proxy process 310 has been started for this VAA 308. If not, a tether proxy process 310 will be created for this VAA 308 before the process of the virtual application 326 is spawned within the VAA 308. Otherwise, the virtual application 326 may run with local namespaces only and be unable to retrieve missing data resources over remote namespaces from the source computer 302. This does not prevent the VAA 308 from running the virtual application 326, but would cause problems if the local namespaces cannot supply a data resource requested by the virtual application 326. In some embodiments, a tether proxy process 310 is started for each VAA 308 with tether functionality enabled.

A running tether proxy process 310 for a VAA 308 may be terminated at the time when that VAA 308 is being undocked or the virtual application 326 associated with the VAA 308 is being terminated.

Computers running operating systems other than Windows™ may not require tether proxy to be a separate process from the rest of the runtime intercept component.

In the case where the requested data resource is a service missing from the target computer 308, the runtime intercept component 306 also enables copying the missing service configuration over to the target computer 304 and linking it in the appropriate local namespace of the VAA 308. Remote logon to the source computer 302 as an administrator permits listing installed services on the source computer 302 and copy selected services from the list over to the target computer 304 to be executed in the VAA 308.

Figure 5:
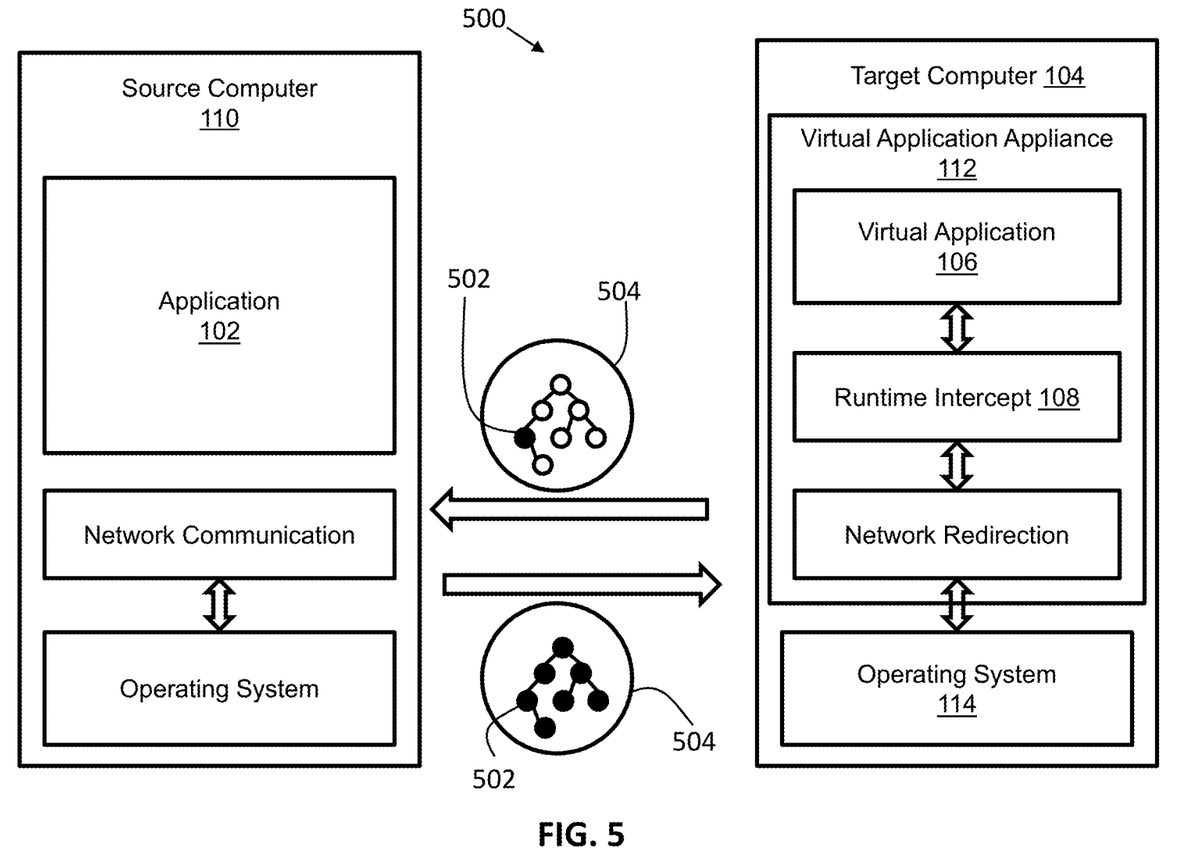
FIG. 5 is a block diagram of the tether approach of FIG. 1 illustrating greedy copy.

Reference is now made to FIG. 5. To accelerate the retrieval algorithms and reduce the number of remote network connections to a source computer 110, some embodiments of the tether approach 500 may use awareness of the application 102 to accumulate dependencies greedily based on file organization and/or patterns of access known for major classes of applications. Greedy copying may also be applied in special cases to the details of specific applications being virtualized. In some embodiments greedy copying is implemented in a greedy copier component of the VAA.

When the runtime intercept component 108 locates a requested date resource 502 on the source computer 110, instead of copying only that item 502, the runtime intercept component 108 may also check if the parent folder, registry key, service or other hierarchical structure 504 of the specified item 502 exists on the target computer 104 and in its VAA 112. If not, the tether approach 500 may recursively copy the items of all or some of the hierarchy 504 to the write namespace of VAA 112. This is called greedy copying. The benefit of greedy copying is to improve tether performance and reduce the number of misses when searching the local namespaces of a VAA 112.

Similar to greedy remote file copying, when the data resource being copied from a remote namespace is from the source computer's registry, instead of copying only the specific registry key, greedy registry copying may also check if the parent key or keys exists on the VAA. If not, some or all of the parent keys may be copied to the VAA to improve tether performance and reduce the number of missing items.

For stacked VAAs where the namespaces of a single VAA references other VAAs on the target computer, multi-source tether is supported. This allows for each of the VAAs referenced to be tethered to source computers, these can be the same source computer or different source computers. Data resources copied from each source computer will be placed into the VAA they are tethered to. Before running an application in the VAA, the administrator can enable tether features and configure the source computer access credentials (network address and login permissions) for each VAA in the stack. It is possible that two or more VAAs share a same source computer, with or without the same access credentials. In the runtime intercept component, if a missing data resource is found through a remote namespace for a shared source computer, say, mysource, the tether approach may copy that item to all the VAAs that have mysource as their source computer.

In some embodiments, it is possible to retrieve environment settings from the source computer during tether configuration. A list of users on the source computer may also be presented during tether configuration, and the option to migrate any users and/or groups missing from the target computer is also possible.

It will be appreciated by those skilled in the art that block diagrams herein can represent conceptual views of illustrative software and circuitry embodying the principles of the technology. Similarly, it will be appreciated that any flow charts, state transition diagrams, pseudocode, data format diagrams and the like represent various configurations, systems and processes which may be substantially represented in computer readable medium and so executed by a computer or processor, whether or not such computer or processor is explicitly shown.

The functions of the various elements may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor", "controller" or "logic" should not be construed to refer exclusively to hardware capable of executing software, and may include, without limitation, digital signal processor (DSP) hardware, read only memory (ROM) for storing software, random access memory (RAM), and non-volatile storage.

When implemented in software, the functions of embodiments of the present disclosure may be stored as one or more instructions or code on a non-transitory computer-readable or processor-readable storage medium. The steps of a method, process or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The hardware used to implement the various illustrative computers, logical blocks, modules, circuitry, registers, memory and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device. Further, the computer may be physically connected to and part of the test system, or it may be connected via such interfaces as known in the art including, for example Ethernet, Bluetooth, WiFi, USB, the Internet, etc.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program", "software" or "code" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Where any components, elements and features described in the present disclosure have been described in some way as connected to other components, elements and features, it is to be understood that such connection includes direct connections, connections through transmission media (wired and wireless) and indirect connections through any other components unless the present disclosure specifically indicates otherwise.

Where examples, alternative embodiments and additional aspects of those embodiments have been described in the present disclosure, those examples, embodiments and aspects may be combined in any manner within a single embodiment unless the present disclosure suggests otherwise.

We claim:

1. A target computer for executing a virtualized application when in a network with a source computer having the application, the target computer comprising:
a non-transient computer readable memory having instructions and data resources; and
a processor connected to the memory for executing the instructions;
the data resources including:
  credentials for remotely connecting to the source computer and copying data resources from the source computer; and
  a virtual application identity for identifying the application installed on the source computer to be virtualized on the target computer;
the instructions including:
  a virtual application appliance (VAA) for:
    intercepting data requests from the virtualized application;
    searching the data resources on the target computer for each data request intercepted;
    providing the requested data to the virtual application from the data resources when the searching finds the requested data in the data resources on the target computer;
    remotely connecting to the source computer using the credentials when the searching does not find the requested data in the data resources on the target computer;
    copying the requested data from the source computer to the data resources of the target computer after remotely connecting; and
    providing the requested data to the virtualized application after remotely connecting;
wherein the data resources further include:
  a local namespace defining memory locations and access permissions for data resources in the memory of the target computer; and
  a remote namespace defining memory locations and access permissions for data resources on the source computer; and
wherein the instructions of the VAA for searching the data resources of the target computer include further instructions for attempting to resolve the requested data resource from the local namespace; and
wherein the instructions of the VAA for copying the requested data from the source computer include further instructions for resolving the requested data resource using the remote namespace to determine the memory location of the requested resource on the source computer.

2. The target computer of claim 1 wherein:
the local namespace includes an ordered hierarchy of local namespaces including a VAA namespace defining memory locations and access permissions for data resources in the memory of the target computer that are used by the virtual application;
the instructions for attempting to resolve the requested data resource from the local namespace include further instructions for searching each namespace of the local namespace in accordance with the ordered hierarchy; and
the instructions of the VAA for copying the requested data from the source computer includes further instructions for linking the requested resource in the VAA namespace.

3. The target computer of claim 2 including instructions and data resources for a second VAA identical to the instructions and data resources for the VAA except that:
the second VAA is associated with a second virtual application identity for identifying a second application installed on a second source computer to be virtualized on the target computer, the second source computer comprising either the source computer or a different source computer;

the second VAA is associated with second credentials for the second source computer;

the second VAA is associated with a second local namespace having a different VAA namespace; and if the second source computer is the source computer, the second VAA is associated with the remote namespace, otherwise, the second VAA is associated with a second remote namespace defining memory locations and access permissions for data resources on the second source computer.

4. The target computer of claim 3 wherein the local namespace of the VAA comprises a shared VAA namespace including the different VAA namespace of the second VAA.

5. The target computer of claim 1 wherein the remote namespace includes an ordered hierarchy of source namespaces defining memory locations and access permissions for data resources in the memory of various source computers.

6. The target computer of claim 1 wherein the instructions of the VAA for copying the requested data from the source computer to the data resources of the target computer include further instructions for:

identifying a hierarchy of data resources around the requested data resource on the source computer which hierarchy is incomplete or absent in the data resources on the target computer; and in response to identifying the hierarchy, copying the hierarchy of data resources from the source computer to the target computer.

7. The target computer of claim 1 wherein the instructions of the VAA include a tether proxy that is an independent process connected to the VAA by a named pipe;

the instructions of the VAA for remotely connecting to the source computer including further instructions for requesting the tether proxy to remotely connect to the source computer if the requested resource is a registry resource; and the tether proxy including instructions for retrieving registry related data resources from the source computer using the credentials and providing the requested registry related data resource to the VAA.

8. The target computer of claim 1 wherein the data resources include files, registry keys, services, security items and environment variables.

9. A computer-implemented method for executing a virtual application on a target computer of a network from an application on a source computer of the network, the method comprising:

providing a virtual application appliance (VAA) on the target computer;

identifying the application to the VAA;

providing, on the target computer, data resources including copies of some data resources associated with the application on the source computer;

intercepting, by the VAA, a request for a first data resource by the virtual application during execution of the virtual application on the target computer;

in response to the intercepting, searching, by the VAA, the data resources for the first data resource;

if the searching finds the first data resource, providing, by the VAA, the first data resource to the application on the target computer from the data resources;

if the searching does not find the first data resource in the data resources on the target computer:

remotely connecting, by the VAA, to the source computer from the target computer;

in response to the remotely connecting, copying, by the VAA, the first data resource from the source computer to the data resources of the target computer; and in response to the remotely connecting, providing the first data resource to the virtual application on the target computer; and further providing, in the data resources of the target computer:

a local namespace defining memory locations and access permissions for data resources on the target computer; and a remote namespace defining memory locations and access permissions for data resources on the source computer;

wherein searching, by the VAA, further comprises attempting to resolve the requested data resource from the local namespace; and wherein the copying, by the VAA, further comprises resolving the requested data resource using the remote namespace to determine the memory location of the requested resource on the source computer; and providing, in the local name space, a VAA namespace defining memory locations and access permissions for data resources in the memory of the target computer that are used by the virtual application; and, hierarchically ordering the namespaces of the local namespace;

wherein the attempting to resolve the requested data resource from the local namespace further comprises searching each namespace of the local namespace in accordance with the hierarchical ordering; and wherein the copying, by the VAA, further comprises linking the requested resource to the VAA namespace.

10. The computer-implemented method of claim 9 further comprising:

providing, on the target computer, a tether proxy that is an independent process connected to the VAA by a named pipe;

the remotely connecting, by the VAA, further comprising requesting the tether proxy to remotely connect to the source computer if the requested resource is a registry resource; and retrieving, by the tether proxy, registry related data resources from the source computer; and in response to the retrieving, providing, by the tether proxy, the requested registry related data resource to the VAA.

11. The computer-implemented method of claim 9 further comprising providing a second VAA identical to the VAA except for:

identifying a different application to the second VAA, the different application on a second source computer that is either the source computer a different source computer;

providing, to the second VAA, a second local namespace having a different VAA namespace; and if the second source computer is the source computer, providing, to the second VAA the remote namespace, otherwise, providing, to the second VAA, a second remote namespace defining memory locations and access permissions for data resources on the second source computer.

12. The computer-implemented method of claim 11 further comprising providing the local namespace of the VAA with a shared VAA namespace that includes the different VAA namespace of the second VAA.

13. A non-transient computer readable memory storing a virtual application appliance (VAA) for managing migration of an application on a source computer to a virtual application within the VAA on a target computer networked to the source computer, the VAA comprising:

resources on the target computer;

a virtual application for execution in the VAA;

network credentials for remotely connecting to the source computer and copying data resources from the source computer;

a runtime intercept for comparing on-demand resource requests of the virtual application to resources on the target computer and providing the requested resource to the virtual application;

a tether for, when the runtime intercept fails to locate the requested resource in the resources on the target computer, remotely retrieving the requested resource from the source computer using the network credentials and then copying the requested resource into the resources on the target computer;

an ordered hierarchy of local namespaces including local paths to resources on the target computer for comparison to on-demand resource requests by the runtime intercept; and, a remote namespace including remote paths to resources on the source computer for retrieval by the tether.

14. The VAA of claim 13 further comprising:

a greedy copier for, when the tether is remotely retrieving the requested resource from the source computer, comparing a hierarchy of resources related to the requested resource on the source computer to the resources on the target computer, and if the hierarchy of resources related the requested resource is incomplete or absent from the resources on the target computer, copying the hierarchy of resources related the requested resource into the resources on the target computer.

* * * * *